(No Model.)
J. BRAUNWALDER.
VALVE GEAR FOR STEAM ENGINES.
No. 286,585. Patented Oct. 16, 1883.
2 Sheets—Sheet 1.
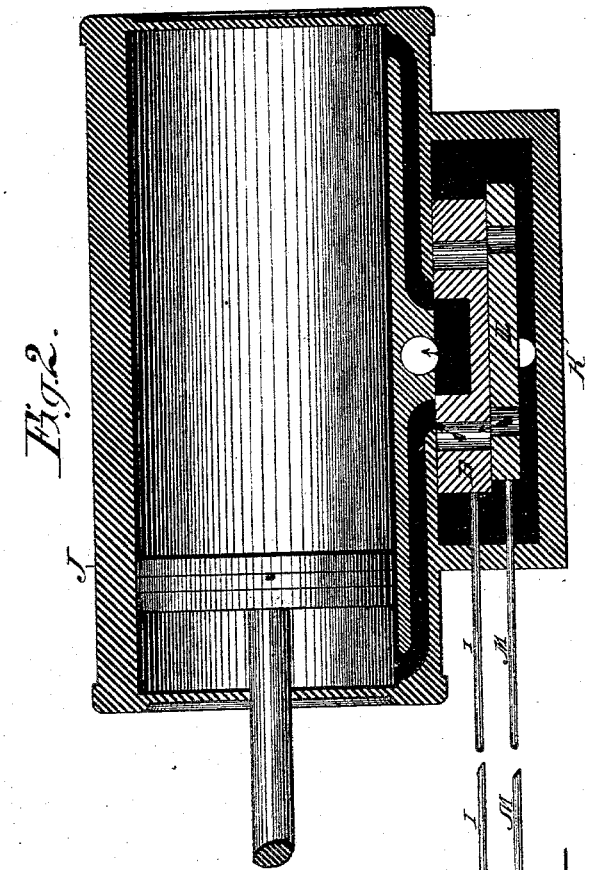
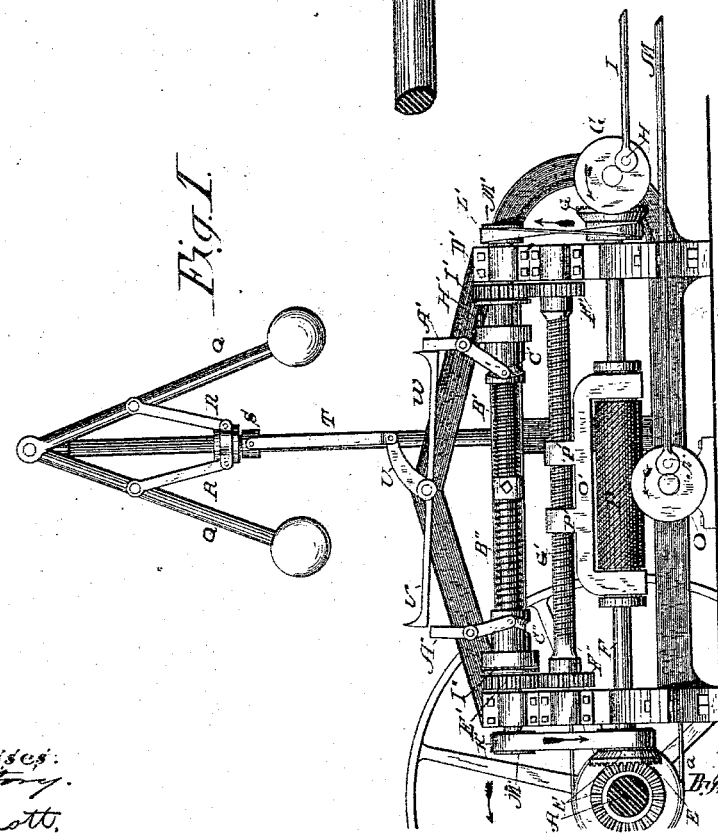

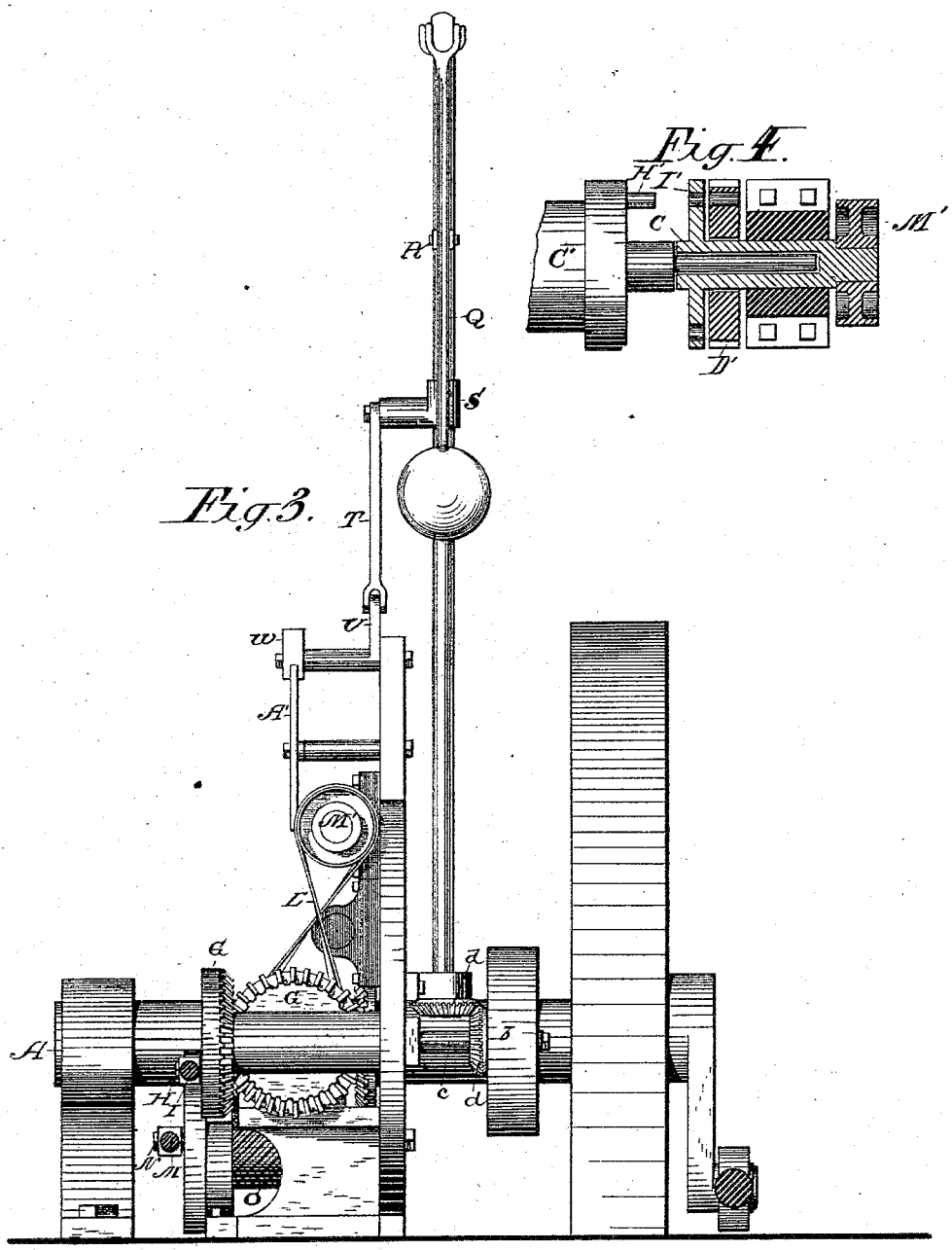

United States Patent Office.

JACOB BRAUNWALDER, OF MILWAUKEE, WISCONSIN.

VALVE-GEAR FOR STEAM-ENGINES.

SPECIFICATION forming part of Letters Patent No. 286,585, dated October 16, 1883.

Application filed April 9, 1883. (No model.)

*To all whom it may concern:*

Be it known that I, JACOB BRAUNWALDER, a citizen of the United States, residing at Milwaukee, in the county of Milwaukee and State of Wisconsin, have invented certain new and useful Improvements in Valve-Gears for Steam-Engines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in steam-engines, and pertains to the devices by which motion is transmitted from the governor to the cut-off valves, whereby said valves are automatically adjusted to admit steam during the whole or any fractional part of the stroke of the piston, as the work of the engine may require.

My improvements are further explained by reference to the accompanying drawings, in which Figure 1 represents a side elevation of my invention, and Fig. 2 a horizontal section of the cylinder and steam-chest with which my valve-gears are adapted to be operated. Fig. 3 is an end view of the device shown in Fig. 1, and Fig. 4 a detail in section.

Like parts are represented by the same reference-letters throughout the several views.

A represents the shaft of the fly-wheel, from which motion is communicated to the governor in the ordinary manner by band *a*, pulley *b*, shaft *c*, and beveled gears *d d*. A continuous uniform reciprocating movement is communicated from said shaft A to the cut-off valve B through beveled gears E E, shaft F, beveled gears G G, crank-pin H, and rod I. J is the cylinder. K is the steam-chest. The steam is regulated in its admission to the cylinder, so as to act expansively or otherwise, as the work of the engine may require, by the cut-off valve L, which valve is controlled by the governor, so as to move either with, alternately in opposite directions to, or at any intermediate point in advance or back of, said valve B, and the relative positions of said valves L and B are continuously changing as the speed of the engine changes. Motion is communicated to valve L from shaft F through rod M, crank-pin N, endless-screw gear O, and endless-screw gear P. When gears O and P maintain the same relative position to each other shown, the valve-rods I and M will also maintain the same relative position to each other and the piston; but such relations of the valves are changed by the forward or backward action of the gear P as said gear P moves forward or toward the cylinder J. The crank-pin N is moved downward or back in its rotary motion, thereby bringing the valve L back relatively to valve B, whereby said valves will be caused to move nearly together. When said gear P moves rearward, the crank-pin N is moved forward in its rotary movement, whereby said valves will be caused to reciprocate in opposite directions, thus causing the ports in the valves to quickly pass each other and cut off the steam when the piston is at the center of the stroke, whereby the steam works expansively. Thus the strokes of the valve are continuously varied as the gear P moves toward the right or left. The forward or rearward motion of said gear P is caused as follows: When the arms Q Q move upward and downward, they, acting through arms R R, sleeve S, bar T, and lever U, raise and lower the arms V W, whereby the arms V W are inclined upward and downward. As the arm W is raised the lever A' is released, when the spiral spring B' throws the sleeve C' toward the right, when pin H' passes through the revolving disk I' and into a recess in the side of pinion D'. Thus sleeve C', disk I', and pinion D' are all coupled together, and motion is communicated from said disk I' through said coupling-sleeve C' to said pinion D', and from said pinion D' to pinion F. The pinion F' is connected to the screw-shaft G', and causes it to revolve toward the left. In like manner, when arm V is raised, lever A'' is released, and the spring B'', acting against the sleeve C'', moves said sleeve outward, when the coupling-pin H' passes through a hole in the revolving disk I'' and engages in a recess in pinion E', whereby motion is communicated from said revolving disk I'' to said pinion. From pinion E' motion is communicated to said screw-shaft G by pinion F″. As either one of the arms V or W is raised the other is simultaneously lowered, when said arms, acting through the lever against which they are brought in contact, uncouples one of said sleeves as the other is coupled. Motion is communicated from shaft F continuously to said disks I′ and I″ through bands K′ and L′ and pulleys M′ M′. The band L′ is crossed, so that pulleys M′ M′ are revolved in opposite directions, whereby it is obvious that said screw-shaft is adapted to be revolved in either direction forward or backward, according to the position of the arms of the governor. When said arms are thrown upward, said screw is revolved toward the right. When said arms drop, said screw is revolved in the opposite direction. The screw-gear P is connected with said screw G by the bracket O′, which bracket is provided with screw-sleeves P′ P′. Thus when said screw revolves toward the right said bracket O′ and screw-cylinder P is moved forward toward the cylinder J, and when the screw revolves in the opposite direction said screw-gear or cylinder moves back or in the opposite direction, whereby it is obvious that the relative position of the ports in the cut-off valves are being continuously changed by the rise and fall of the arms of the governor, and the steam is permitted to follow the piston its entire stroke, or is cut off and allowed to act expansively at any intermediate point in the stroke of the piston, as the work of the engine may require.

Having thus described my invention, what I claim as new, and desire to secure by Letters Patent, is—

1. The combination, with the respective valve-rods I and M, of the cylindrical gears O and P, as arranged at right angles to each other, and adapted by the forward and rearward movement of gear P upon gear O to change the relative position of the valves, whereby the steam is admitted to the cylinder during the whole or any fractional part of the stroke of the piston, said gears being connected with said valve-rods and the governor by the intermediate mechanism, substantially as described.

2. The combination of valve B, as connected with the operative mechanism of the engine, having uniform rotary movement, valve L, and mechanism adapted to automatically vary or change the relative position of said valves, said varying mechanism consisting in connecting spiral gears O and P, bracket O′, screw G′, rotating shaft F, said shaft being connected with the drive-shaft A and adapted to rotate said cylinder P, said screw being connected with the governor by mechanism adapted to reverse the motion of said screw, whereby said gear P is caused to move longitudinally backward and forward on said gear O as they revolve, substantially as set forth.

3. The mechanism for transmitting motion from the governor to the regulating-valve of an engine, consisting in the combination of collar S, bar T, arm U, arms V and W, levers A′ A″, coupling-collars C′ C″, gears E′ F F′ F″, screw G′, bracket O′, screws O and P, rod M, springs B′ B″, shaft F, bands K′ L′, pulleys M′ M′, coupling-flanges I′ and I″, and coupling-pins H′, said shaft F being adapted to communicate a rotary motion to the spiral gear P, while said screw G communicates a longitudinal reciprocating motion thereto, said screw being reversed in its rotary movement by the joint action of the governor and operative mechanism of the engine, all substantially as and for the purpose specified.

In testimony whereof I affix my signature in presence of two witnesses.

JACOB BRAUNWALDER.

Witnesses:
W. J. SINNOTT,
JAS. B. ERWIN.